June 28, 1927.
D. GONZALEZ
ANIMAL AND BIRD TRAP
Filed Oct. 21, 1926
1,633,857
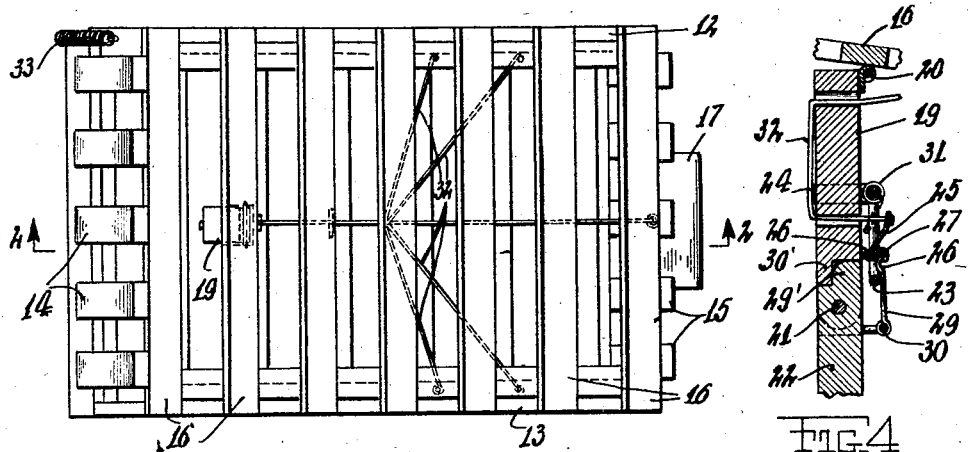
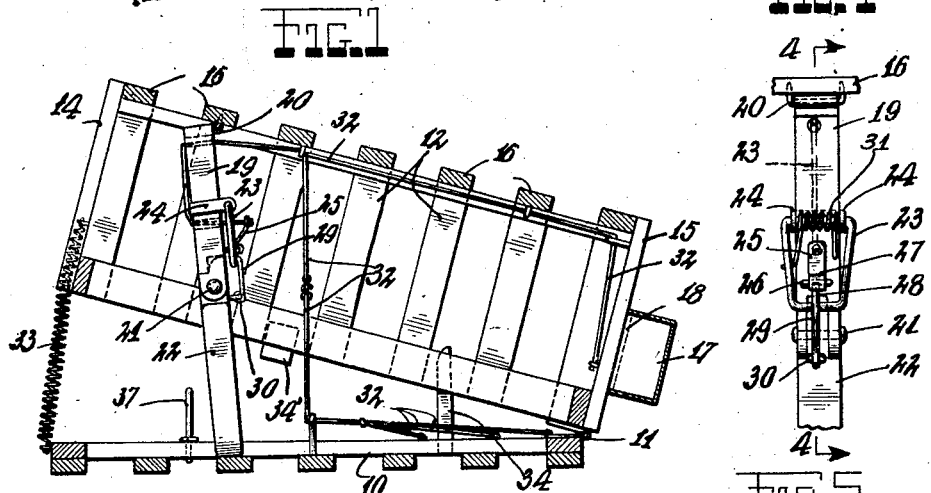
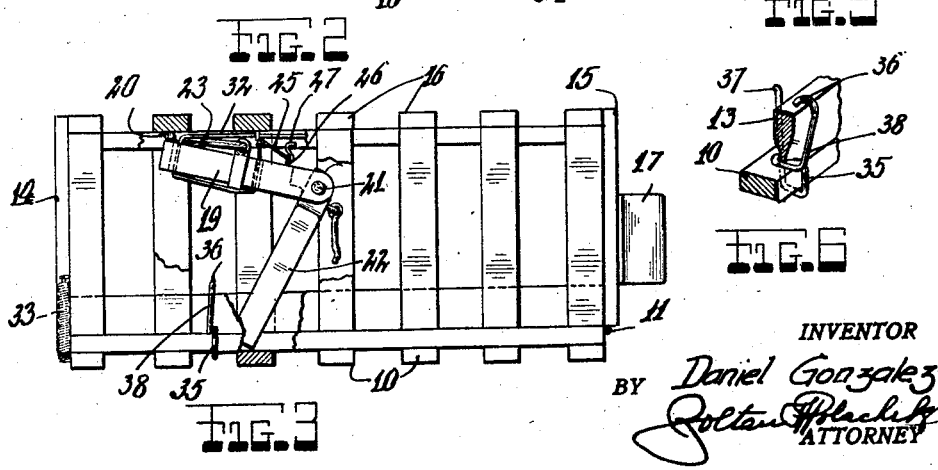
INVENTOR
Daniel Gonzalez
BY
ATTORNEY Patented June 28, 1927.

1,633,857

UNITED STATES PATENT OFFICE.

DANIEL GONZALEZ, OF GALLUP, NEW MEXICO.

ANIMAL AND BIRD TRAP.

Application filed October 21, 1926. Serial No. 143,054.

This invention relates generally to traps used to catch animals and birds, the invention having more particular reference to a novel type of trap used to catch animals and birds without injury to the said animals or birds.

The invention has for an object the provision of an improved trap of novel construction and arrangement of parts.

For further comprehension of the invention, and of the objects and advantages thereof, reference will be had to the following description and accompanying drawings, and to the appended claims in which the various novel features of the invention are more particularly set forth.

Fig. 1 of the drawings is a top plan view of my improved animal and bird trap, illustrating same in an open or set position to catch animals or birds.

Fig. 2 is a longitudinal sectional view taken on the line 2—2 of Fig. 1.

Fig. 3 is a side elevational view, partly in section, so as to expose certain interior parts, illustrating my improved device in a closed or sprung position.

Fig. 4 is a fragmentary sectional view, taken on the line 4—4 of Fig. 5.

Fig. 5 is an enlarged fragmentary detail view of the trap proper as used in combination with my improved device.

Fig. 6 is an enlarged fragmentary sectional perspective view of the locking device, as used in combination with my improved device.

As here embodied my improved animal and bird trap comprises a base 10, preferably of open construction, rectangularly shaped, and having hinged thereto, at one end, as at 11, a cage comprising sides 12 and 13, ends 14 and 15, and a top 16, the later mentioned elements preferably of open construction, so as to permit air to enter the said cage, and so as to prevent the escape of the animals or birds to be caught.

The container 17, of box-like construction, adapted to hold any desired suitable bait, is attached to the end 15 of the cage, and is provided with an open side 18, so as to permit the animal or bird to be caught, which will enter the said cage to eat the said bait placed and contained therein.

The upper support 19 is hinged, at its upper extremity, as at 20, to the top 16 of the said cage, and has pivotally attached, at its lower extremity, as at 21, a lower support 22.

The trap proper comprises a latch member 23, formed of wire or the like, pivotally attached as at 24 to the upper support 19, and extended therefrom. The catch 25, is pivotally attached, as at 26, to the upper support 19 and is provided with a hook shaped extremity 27, adapted to engage the hook shaped extremity 28 of the engaging member 29, which is pivotally attached as at 30 to the lower support 22.

It being understood that the catch 25 is positioned or located inside the latch member 23, and that the hook shaped extremities 27 and 28 are engaged over the latch member 23, and that the lower support 22 is provided with an extended portion 29' adapted to engage in a notch 30' or recess formed in the upper support 19, so as to hold the said supports in an extended position, which will hold the said cage in an open or set position, so as to permit the animal or bird to be caught to enter the said cage, as clearly shown in Fig. 2, of the accompanying drawings.

The coil spring 31 is wound on the latch member 23, and is adapted to disengage the hook shaped extremities 27 and 28, when the flexible members 32 are pulled, so as to permit the tension spring 33, attached to the end 14 and to the base 10, to spring or close the said cage so as to catch or entrap the animal or bird enticed therein.

The flexible members 32, may be attached to and located inside the said cage and led or extended to any desired parts thereof, so as to be located in the way of the said animal or bird, as clearly shown in Fig. 2, of the accompanying drawings.

The guides 34 and 34' are attached to the base 10 and to the sides 12 and 13 of the said cage and extended therefrom, so as to cause the said cage when closing to permit the hook shaped extremity 36 of the locking members 35 consisting of wire or the like, attached to the base 10 by looping the said locking members 35 around the base 10, the locking members 35 having an extended extremity 37 bent so as to permit the tapered portions 38 of the sides 12 and 13, adjacent thereto, to insure the engagement of the sides 12 and 13 of the cage with the hook shaped extremity 36 of the locking member 35, so as to securely hold the said cage in a closed position, so as to prevent the escape of the animal or bird caught therein.

While I have above described the preferred form, construction and arrangement of the several elements employed, it will be understood that the device is, nevertheless, susceptible of considerable modification therein, and I therefore reserve the privilege of resorting to all such changes as may be fairly embodied within the spirit and scope of the invention as claimed.

Having thus described my invention, what I claim as new and desire to protect by Letters Patent of the United States is as follows:

1. In an animal and bird trap of the class described, a base having a cage hinged thereto, a container adapted to hold bait attached to the said cage, in upper support pivotally attached to the top of the said cage, a lower support pivotally attached to the said upper support, a trap proper attached to the said upper support, adapted to hold the said cage in an open position, flexible members attached to the said trap proper as a means of closing the said cage, so as to entrap animals or birds enticed therein, said cage provided with a locking means, so as to prevent the escape of the said animals or birds entrapped therein.

2. In an animal and bird trap of the class described, a trap proper comprising a latch member pivotally attached to an upper support, and extended therefrom, a catch pivotally attached to the said upper support, and provided with a hook shaped extremity adapted to engage a hook shaped extremity of an engaging member pivotally attached to a lower support, said hook shaped extremity and said second hook shaped extremity engaged over the said latch member, a coil spring wound on the said latch member and adapted to disengage the said hook shaped extremity and the said second hook shaped extremity, when the flexible members attached to the said catch are pulled so as to close the said cage.

In testimony whereof I have affixed my signature.

DANIEL GONZALEZ.